Sept. 30, 1958 — M. S. CLARK — 2,854,259

SELF-SEALING DETACHABLE COUPLING

Filed May 16, 1955 — 2 Sheets-Sheet 1

INVENTOR.
MALCOLM S. CLARK
BY
Woodling and Krost
Attys.

2,854,259
Patented Sept. 30, 1958

2,854,259

SELF-SEALING DETACHABLE COUPLING

Malcolm S. Clark, Union City, Pa., assignor to Snap-Tite, Inc.

Application May 16, 1955, Serial No. 508,620

7 Claims. (Cl. 284—19)

This invention relates to detachable couplings and more particularly to couplings of the type disclosed in my copending application Serial No. 433,650 for the conveyance of fluids under high pressure.

An important object of the invention is the provision of valve means in the coupling which are opened by the action of connecting the coupling members and are closed by the action of disconnecting said members, and in which coupling there is provision of sealing means between the members which are arranged and active to prevent or minimize leakage or spillage of the high pressure fluid when the coupling members are being connected, disconnected or while the members are in a connected coupled condition. Such couplings find invaluable use particularly in the handling of combustible mediums and in the refueling of ships or aircraft while in transit.

Another important object is the provision of a coupling having valve means held against positive stops to prevent chatter in both open and closed positions, and which valve means when incorporated in each coupling member cooperate in holding both valve means in open condition against positive stops when the two members are coupled.

A further important object is the provision of interlocking means between the two coupling members which serves to hold the valves in open position against the action of their springs and against positive stops when the members are coupled, and these springs hold the valves closed against positive stops when the members are uncoupled.

Another important object is the provision of latching or locking means for interlocking the two members of the coupling together and which includes a locking sleeve which when in its normal locking position must be first turned about its axis before it can be moved axially to release the locking means to connect or to disconnect the members and which locking sleeve after being so moved will automatically return to its original locking position to normally project the locking means to a locked position when said members are coupled or uncoupled.

Another object is the provision in a coupling member of a valve sleeve having resilient sealer means seatable upon a valve seat with ports therein, but which sealer means is not caused to slide over the edges of said ports in moving to and from said seat.

A further object is the provision of a valve in a coupling member which is securely held against travel stops in both open and closed positions to assure full open and closed positions of the valve and to obviate vibration and chatter thereof.

Another object is the provision of a valve construction utilizing a relationship of the internal diameter of an annular elastic O-ring and a valve member cooperating therewith, whereby relative movement of these elements may position the valve member axially within the opening of the ring to cut off the flow therethrough, or may position these parts to allow flow through the opening in the ring.

A still further object of the invention is the provision of a coupling with specially constructed valve mechanism which, when in an open position, will assure a flow of fluid through the coupling equal to the capacity of the line with which it is connected.

Still another object of the invention is the provision of a coupling member having an end closure member, preferably in the form of an adaptor, which forms one of the travel stops and which can be readily removed to provide access to all interior coupling parts.

A further object of the invention is to generally improve the construction of the coupling disclosed in my copending application Ser. No. 433,650.

Other objects and advantages of the invention will become apparent during the course of the following description. In the accompanying drawings forming a part of the description and wherein like numerals are employed to designate like parts throughout the several views, in which.

Figure 1:
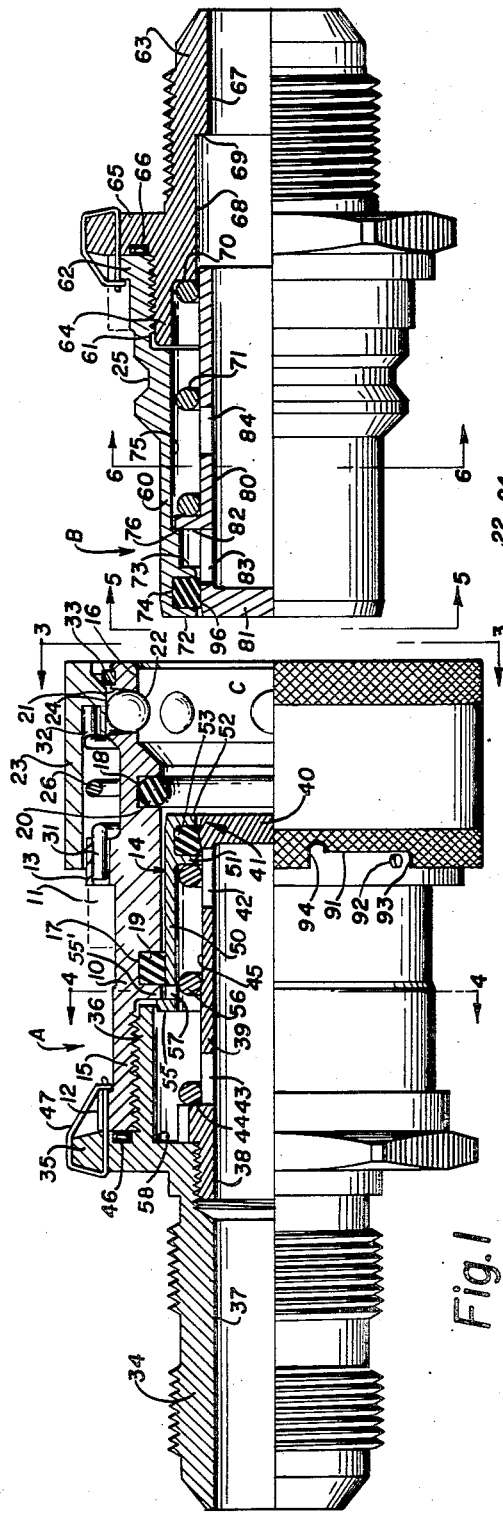
Figure 1 is a side elevational view with one-half thereof shown in section and illustrating the male and female members prior to being connected or coupled.

Briefly, the improved coupling is composed of a female member or coupler A and a male member B adapted to be installed in a fluid pressure line and to be releasably coupled together in telescopic, coaxial fluid conducting relation by a locking device C. Both coupling members are preferably made from round ferrous or non-ferrous, non-corrosive stock. The coupler A is a cylindrical body 10 machined on its exterior with suitable flats 11 for wrench grips, an annular flange 12 at its outer and an annular flange 13 at its intermediate portion. The body 10 is provided with an axial reduced bore 14, which at its outer end is enlarged and threaded as at 15 and which at its inner end is enlarged as at 16. The smaller diameter bore portion 14 is provided at widely spaced points near the enlarged portions of the bore with grooves 17 and 18 for the reception of sealing means preferably in the form of elastic rubber O-rings 19 and 20 respectively. From the ring 19 to the enlarged end 16, the bore in this female member constitutes a socket for the reception of a male nipple B. It will be particularly observed that the sealing ring 18 is located a considerable distance from the inner open free end of the socket for a very definite purpose to be presently described. These two rings when not engaged by contacting parts are of circular cross-section and extend into the bore 14, but when contacted by other valve parts are compressed and flattened to fill their respective grooves. The inner socket end of the body 10 is provided with a series of radial openings 21 around its circumference and these openings are tapered outwardly toward the periphery of the body as shown to each receive a detent in the form of a locking cam or ball 22, which when in locking position, are projected into the enlarged bore 16 on the socket as shown in Figure 1.

In order that these locking balls or cams will be held in locked positions when the female member is connected with or disconnected from the male member B, a locking sleeve 23 is slidably and oscillatably mounted on the female member and has a land or cam surface 24 normally held engaged with the balls to normally hold them projected in locked positions in annular external groove 25 in the male member. The outer end edge of this locking sleeve is provided with a circumferential recess or cutaway portion 91 to receive a radial pin 92 anchored in the flange 13 to limit relative rotation of the sleeve on the female member in both directions and to provide a limit to the sliding movement of the sleeve in one direction unless turned on its axis. The cut-away portion or bayonet slot is provided with a shoulder 93 at one end thereof and an angular slot 94 at the other end thereof extending longitudinally of the sleeve. The long edge 91 of the cutaway may be slightly inclined from the shoulder 93 to the slot 94 and serves to prevent sliding movement of the sleeve in an unlocking direction until the sleeve is turned on its axis to position the angular portion 94 of the slot opposite the pin 92. A combined torsion and compression spring 26 concealed under the locking sleeve 23 has one end 31 bent at a right angle and inserted into a hole in the flange 13, while the other end 32 of this spring is bent at a right angle to be received in a hole in the inwardly directed flange of the locking sleeve. This spring being tensioned within the limits of its cavity, normally biases the locking sleeve to a position to cam the balls to locking positions. This spring is also torsionally wound and connected with the locking sleeve to normally bias the latter to turn about the axis of the female member until stopped by the shoulder 93 engaging the pin 92. To release the locking balls 22 to permit connection or disconnection of the coupling members, the locking sleeve 23 must be first turned in the opposite direction against the torsion of the spring until the edge of the slot 94 engages the pin 92, after which the sleeve may be manually moved longitudinally against the tension of the spring to dispose the pin 92 in the angular portion 94 of the slot. This axial movement of the locking sleeve outwardly of the female member causes its cam surface 24 to disengage the balls 22 and permit them to move to an unlocked position. When manual grip upon the locking sleeve is released, the tension of spring 26 acts to slide the sleeve axially inwardly of the female member to depress the balls to locked positions and free the pin from the angular portion of the slot at which time the torsion of the spring 26 will turn the sleeve about its axis until the shoulder 93 stops against the pin 92. Axial movement of the locking sleeve in the opposite direction is stopped by a stop ring 33 to retain the cam portion 24 of the locking sleeve in engagement with the balls and project them radially into the enlarged bore forming the female socket.

Since the couplings are designed for use with various required thread, flange and bulkhead mountings, an adaptor 34 having the required construction to fit its use assumes the form of a cylindrical hollow member with an enlarged annular radial flange 35 near its inner end and with an axially extending connecting portion 36 to engage the threads 15 of the female body 10. The flange 35 has a groove in its side nearest the end of the female member to receive either a standard synthetic rubber O-ring or a standard steel metallic hollow core O-ring 46 which is pressed tightly against the end of the female body 10 by threading the connecting portion of the adaptor into the body to provide a fluid-tight seal. The flanges 35 and 12 are provided with openings adapted to register for the insertion of a wire locking bail 47 to lock the adaptor to the female body.

The internal diameter of this connecting portion 36 is larger than the reduced bore 14 in the female body. The smaller bore 37 of this adaptor near the portion 36 is slightly enlarged and threaded to receive the threaded end 38 of a tubular extension 39 extending axially into the bore 14 beyond the ring 19 and to a point just outwardly beyond the ring 20 to terminate in a closed end 40 having an annular enlarged valve seat 41. Relatively speaking, this seat 41 is, with respect to the female socket, disposed further "inwardly" in the socket than the sealing ring 20 for a very definite purpose which will later be described. Near the base of the seat 41, the extension 39 is provided with a series of radial flow ports 42. A similar series of relief ports 43 is arranged at the base of a flange 44 formed on the extension near its threaded end 38. The outer diameter of the extension 39 from the valve seat 41 extending between the ports 42 and 43 is reduced as at 45 for a purpose which will presently appear. It will be observed that the valve seat 41 is slightly larger in diameter than the adjoining ported portion 42 of the extension 39 and is tapered axially in both directions to cause compression of a rubber sealing member carried by a valve member to be presently described, and also to form a guide surface for the nipple of the male member as the coupling members are connected.

Figure 2:
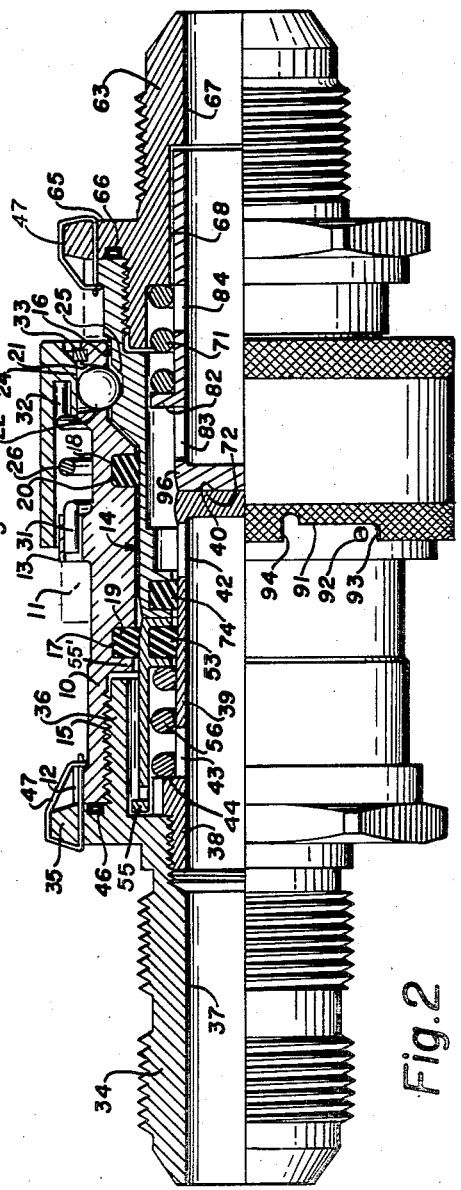
Figure 2 is a similar view showing the male and female members connected or coupled and locked in this position.
Figure 3:
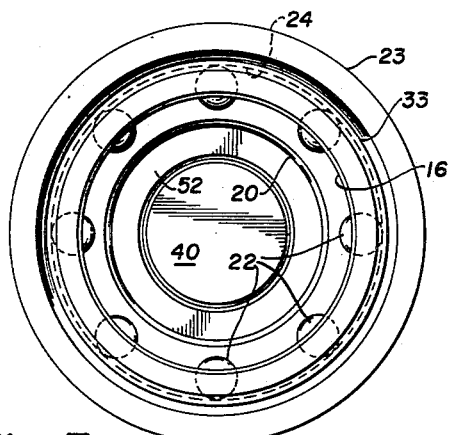
Figure 3 is an end elevation of the socket end of the female member.
Figure 4:
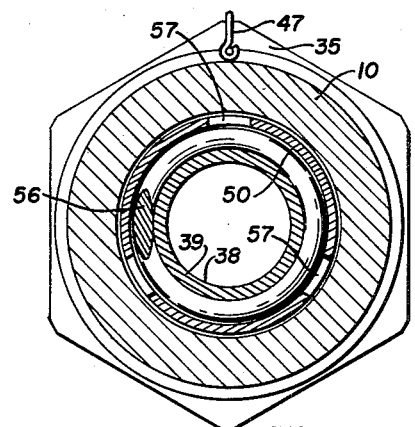
Figure 4 is a transverse section taken through the female member on line 4—4 of Figure 1.
Figure 5:
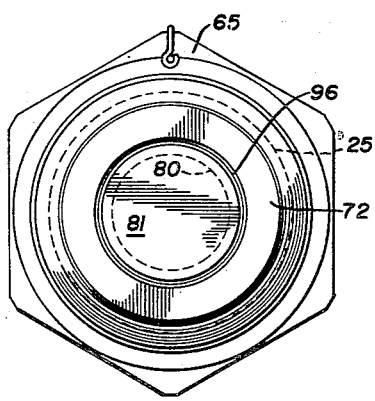
Figure 5 is an end elevation of the nipple end of the male member.
Figure 6:
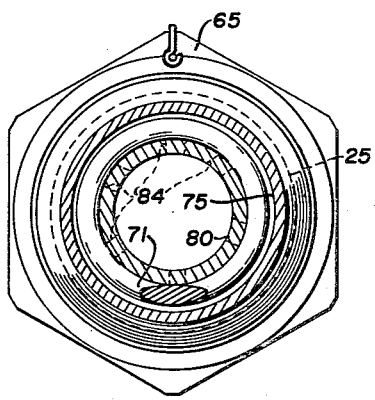
Figure 6 is a transverse section through the male member taken on the line 6—6 of Figure 1.

Slidably mounted in the reduced bore 14, and always engaging the sealing ring 19, is a sleeve valve 50 having at its end nearest the valve seat 41 provided with a pair of inwardly extending flanges 51 and 52 defining a groove therebetween for the reception of an elastic valve O-ring 53 of a construction like the rings 19 and 18. The sleeve valve 50 is normally biased toward the female socket by a compression spring 56 and to a closed position to cause the sealing ring 53 to engage the tapered seat 41 and be compressed thereby to cut off fluid flow through the female member. One end of this spring abuts the flange 44 while its other end presses against the flange 51. As shown in Figure 1, the outer end of the sleeve valve is provided with an outwardly extending radial flange 55 which abuts a shoulder 55' provided by the reduced bore 14 when the valve sleeve 50 is in a closed position to limit its travel in one direction so that the sleeve valve will not be forced beyond its seat 41 and to prevent chatter. When this valve sleeve 50 is in an open position, as shown in Figure 2, the flange 55 abuts a second stop shoulder 58 of the adaptor 34 to limit the opening movement of the valve sleeve. At the base of this flange 55, the valve sleeve has radial ports 57 to release fluid from between the outside diameter of the sleeve valve and the connecting portion 36 of the adaptor. This fluid together with fluid in the cavity housing the spring 56 will be forced back into the fluid stream through the openings 43 when the sleeve valve 50 moves off its seat 41.

The male member B of the coupling has an elongated hollow nipple 60 enlarged at its outer end and provided with the ball locking groove 25 as previously stated, and the outer end of this nipple is further enlarged or thickened to provide a threaded internal socket 61. The outermost end of the nipple body is equipped with an external radial annular flange 62. An adaptor 63, of any desired type to fit the installation, is provided with an axial threaded flange 64 to screw into the threaded socket 61 and force an external radial flange 65 of the adaptor against the flange 62. The side of this flange 65 is recessed to receive a leakage seal preferably in the form of a standard steel metallic hollow core ring 66, which like the ring 46 can be deformed by pressure but which will return to its original round section when pressure is relieved therefrom. This adaptor has a first bore 67 substantially equal in diameter to the inner diameter of the hollow extension 39, a second larger bore 68 forming a valve guide surface and a stop shoulder 69, and a third larger bore forming a stop shoulder 70 for one end of a compression spring 71 housed within the nipple. The free end of the nipple 60 is tapered as shown and is pprovided with an inwardly extending flange 72. Spaced from this flange and extending inwardly from the nipple to the same degree is a second flange 73. The free peripheral edges of these two flanges define a diameter substantially equal to the bore 68, and the adjacent sides of these two flanges define a groove for the reception of a rubber O-ring 74 like the ring 53 of the female member. When the free end of the nipple 60 is being inserted into the socket, the tapered end of the nipple engages the sealing ring 20 before the flange 72 engages the flange 52 of the female sleeve valve 50 to unseat the same, while the inner periphery of the ring 74 rides over the tapered valve seat 41 to be guided thereby into the annular space being vacated by the female sleeve valve 50 and its flange 52 as it is being unseated by the insertion of the male nipple into the female socket. The bore 75 through the nipple near the flange 73 is reduced to provide a second stop shoulder 76.

A tubular male valve body 80 has its outer end 81 closed and its peripheral end 96 which seats on the ring 74 is slightly tapered outwardly as shown, to have a smooth seating action upon this ring. When the coupling members are disconnected, this valve body 80 is seated on the ring 74 by the spring 71; and its outer closed end 81 is maintained flush with the outer face of the inturned flange 72 by reason of an exterior annular flange 82 carried by the male valve 80 abutting the stop shoulder 76. This flange 82 slides on the bore 75 while the outer end of the valve 80 slides on the bore 68 to guide the valve in a true axial path. The ends of the spring 71 engage the flange 82 and shoulder 70 to normally bias the valve to a closed position where the flange 82 abuts the shoulder 76 to limit the closing movement of the valve. When the valve body 80 is in a wide open position, the inner end of this body engages the shoulder 69 to limit the opening movement. It will be noted that the valve body 80 and the valve sleeve 50 have exactly the same degree of travel in opening and closing movements so that when the coupling members are coupled, the valve 50 of the female member will abut the shoulder 58, while the end of the male valve 80 will abut the shoulder 69, while the locking balls 20 will be held engaged in the groove 25 of the male nipple. Thus, the locking balls 22 serve to hold the valves of the two members engaged with their stop shoulders 58 and 69 when the members are coupled. When the two members are uncoupled, the valve springs serve in holding their respective valve members engaged with their respective stop shoulders 76 and 55'. The body portion of this valve 80 is provided with a series of lateral ports 83 between its closed end 81 and the flange 82 to allow maximum fluid flow through the nipple when connected with the female member, and is provided with a second series of lateral ports 84 to allow passage of fluid to and from the bore of the spring cavity behind the guide flange 82.

When connecting the male and female members A and B, which contain fluid under pressure, the nipple 60 is moved axially into the socket of the female member in which it immediately makes a sealing contact with the O-ring 20 to thereby seal the two members against leakage and spillage before the closed end 81 of the male valve engages the closed end 40 of the female valve to be opened thereby and before the flange 72 of the nipple 60 engages the flange 52 of the female valve sleeve 50 to unseat the same from its seat 41. Thus, there can be no spillage of the fluid or inclusion of air when the members are connected or are being connected. Likewise, no spillage or leakage can occur when the members are being disconnected, because the valves in both male and female members are closed before the nipple is disengaged from the sealing ring 20. When the two members are moved to connect or disconnect them, it will be observed that as the valve sleeve 50 is moved along the female extension 39 to control the ports 42, the valve ring 53 rides free of contact with the edges of these ports and will not be damaged by contact therewith. In movements of the male valve 80, there are no port edges to move across resilient sealing rings and therefore no danger of damaging the seal 74. After the free end of nipple 60 engages the seal 18 and moves farther into the socket and the female valve 50 is being unseated by the nipple end 72, the male valve 80 is also simultaneously unseated and pushed back into the bore of the nipple by the closed end 40 of the extension 39 moving through the opening in the ring 74 and into the hollow nipple until the open ports 42 of the female extension 39 are disposed to open into the bore 75 of the nipple. Thus, when connected, the female part carrying the seat 41 and ports 42 is enclosed by the nipple and the male nipple and its ports 83 and 84 are enclosed by the socket of the female member, thus creating not only a telescopic relation of the male and female members but also a telescopic relation of the valve parts of these two members. Leakage past the outside diameter of the female valve sleeve 50 is prevented by the ring 19, while the ring 20 prevents leakage past the outside diameter of the nipple 60 when it is connected with the female member.

Each of the valve seats 41 and 96 of the two members is sufficiently broad or extended to allow both rings 53 and 74 to simultaneously engage their seats, or at least to allow one of these rings to be in the act of moving onto the seat as the other ring is in the act of moving off its seat. Thus, there is provided a delayed simultaneous full opening and closing of the valves to allow for a greater lapse of time between the time when the seal 20 engages or disengages the nipple before a full opening or closing of these valves. It will also be observed that as the nipple displaces the female valve during coupling of the members and moves beyond the enlarged valve seat 41, the O-ring 74 of the male member will also ride free of contact with the reduced diameter 45 of the extension 39 so that it will not be marred or scored by the edges of the ports 42. It will also be observed that the internal diameter of the valve ring 53 serves as valve seal and guide for the enlarged head 41 which is stopped in engagement with the internal diameter of the ring to form a valve seal when the relative movement of these parts is stopped by the stop flange 55'. Likewise, the closing movement of the male valve 80 is stopped on the internal diameter of the ring 74 by the flange 82 abutting the stop shoulder 76. Thus, the stop shoulders in each of the two coupling members not only prevent vibration and chatter of their respective valve elements in either open or closed positions, but these stop shoulders insure proper seating of the valves on the inside diameter of its respective sealing ring.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A detachable coupling comprising, a female member having a bore terminating in a socket having an open end at one end thereof, sealing means in the bore of said socket and arranged a substantial distance inwardly of the open end thereof, a hollow extension, means mounting said hollow extension axially in and in spaced relation to said bore, said hollow extension terminating in a closed end arranged farther inwardly of said open end of said socket than said sealing means, said closed end being of larger diameter than said extension to form a valve seat, said extension having a lateral port adjacent said seat, a sleeve valve mounted on said hollow extension and normally biased to said closed end of said hollow extension and slidable axially in said bore and having a portion provided with sealer means normally engageable with said enlarged seat to cut off flow through said female member, first and second shoulders on said female member, a flange on said sleeve and adapted to engage said first and second shoulders between the limits of its travel, a male member having a nipple insertable into said open end of said socket and engageable with said sealing means prior to its engagement with said valve sleeve to move the latter away from said seat after said nipple has sealingly engaged said sealing means, said nipple having a passage receiving said ported end of said extension as said nipple moves said sleeve valve axially to uncover said port within said passage of said nipple, and means for releasably interlocking said nipple in said socket in engagement with said sealing means of said female member.

2. A detachable coupling comprising, a female member having a bore terminating in a socket having an open end at one end thereof, sealing means in the bore of said socket and arranged a substantial distance inwardly of the open end thereof, a hollow extension, means mounting said hollow extension axially in and in spaced relation to said bore, said hollow extension terminating in a closed end arranged farther inwardly of said open end of said socket than said sealing means, said closed end being of larger diameter than said extension to form a valve seat, said extension having a lateral port adjacent said seat, a sleeve valve mounted on said hollow extension and normally biased to said closed end of said hollow extension and slidable axially in said bore and having a portion provided with resilient sealer means normally engageable with said enlarged seat to cut off flow through said female member, first and second shoulders on said female member, a flange on said sleeve and adapted to engage said first and second shoulders between the limits of its travel, a male member having a nipple insertable into said open end of said socket and engageable with said sealing means prior to its engagement with said valve sleeve to move the latter away from said seat after said nipple has sealingly engaged said sealing means, means for releasably interlocking said nipple in said socket in engagement with said sealing means of said female member, and said nipple being sealingly engaged with said sealing means after said valve is biased to its seat and before said members are disconnected.

3. A detachable coupling comprising, a female member having a bore terminating in a socket having an open end at one end thereof and a pair of spaced stop shoulders, sealing means extending into said bore of said socket and arranged a substantial distance inwardly of the open end thereof, a hollow extension, means mounting said hollow extension axially in and in spaced relation to said bore, said hollow extension terminating in a closed end arranged farther inwardly of said open end of said socket than said sealing means, said closed end being of larger diameter than said extension to form a valve seat with surfaces tapering axially in opposite directions, said extension having a lateral port adjacent said seat, a sleeve valve slidable axially on said extension and having its inner periphery provided with resilient sealer means engageable with said tapered surface of said valve seat to cut off flow through said female member, said sleeve valve having means engaging said stop shoulders at the limits of its open and closed positions, means normally urging said sleeve valve to a closed position, a male member having a nipple insertable into said open end of said socket and engageable with said sealing means prior to its engagement with said sleeve valve to move the latter away from said seat after said nipple has sealingly engaged said sealing means, said male member having a bore having its walls provided with spaced stop shoulders and sealing means, a ported sleeve valve slidably mounted in said male bore and having a tapered end engageable with said male sealing means, means normally urging said ported sleeve valve to a closed position, and said male valve having means engaging said stop shoulders of said male members at the limits of its open and closed positions, the valves of both male and female members being prevented from vibration by engagement with said shoulders when in open and closed positions.

4. The structure recited in claim 3 in combination with means for releasably interlocking said nipple in said socket and for holding the valves of said members in open position and engaged with their respective stop shoulders.

5. A coupler unit comprising a member having an axial bore reduced in diameter at its intermediate portion to provide a stop shoulder and a socket having an open end at one end of said member, a pair of axially spaced grooves in said reduced portion of said bore, a first resilient sealing member in the groove nearest the open end of said socket, a second resilient sealing member in the groove located farthest from the open end of said socket, a hollow extension extending axially in said member and terminating in a closed end having an enlarged peripheral valve seat arranged between said first and second sealing members, said extension having a lateral port adjacent said closed end and seat, a sleeve valve slidably mounted by said reduced bore and having its outer periphery engaging said second sealing member, said hollow extension being smaller than said closed end which forms said enlarged peripheral valve seat, said sleeve valve having its inner periphery provided with a resilient sealing member riding free of said lateral port of said extension and having its inner periphery adapted to seat upon said enlarged seat, and said sleeve valve having an outwardly extending flange to engage said stop shoulder when the sealing member of said sleeve valve engages said seat.

6. A detachable coupling including in combination a female and a male member, said female member comprising first and second end portions and having wall means defining a bore therethrough, said wall means at said first end portion forming a first groove, a first sealing member residing in said first groove, said wall means at said second end portion forming a second groove, a second sealing member residing in said second groove, a first adaptor having a bore therethrough threadably secured to said second end portion of said female member, a hollow extension threadably secured to and mounted by said adaptor and communicating with said bore therein, said hollow extension extending axially in said bore of said female member and having a closed end terminating short of said first sealing member, said hollow extension being spaced from said wall means of said female member to define an annular chamber therewith, lateral ports providing fluid communication between said hollow extension member and said annular chamber, said closed end of said hollow extension member being of larger diameter than said extension and forming a valve seat, a sleeve valve residing in said annular chamber around said hollow extension member and movable between an open and closed position, said sleeve valve including an annular axially extending sleeve part having first and second end portions and located adjacent said wall means and engageable in all positions with said second sealing member, said first end portion of said sleeve part having first and second inwardly extending flanges defining a valve groove, a sealing member in said valve groove and engageable with said valve seat in closed position of said sleeve valve, said second end portion of said sleeve part having an outwardly extending stop flange, open and closed sleeve valve stops on said adaptor and female member respectively, said stop flange engageable in open and closed positions with said open and closed sleeve valve stops respectively, a port extending through said sleeve part of said sleeve valve, a spring member surrounding said hollow extension and engaging said first inwardly extending flange at one end thereof and engaging a shoulder on said hollow extension at the other end thereof to urge said sleeve valve to said closed position, said male member having first and second end portions and wall means defining a bore therethrough, said first end portion including an annular nipple portion having first and second inwardly extending flanges defining a groove, a sealing member residing in said groove, a second adaptor having a bore threadably secured to said second end portion of said male member, a hollow valve member mounted in said male member and having a closed end at said first end portion of said male member, said closed end of said hollow valve and sealing ring in male member forming a valve closure, said hollow valve member and said bore of said male member defining an annular chamber, lateral ports providing fluid communication between said hollow valve member and said male annular chamber, an outwardly extending flange on said hollow valve member in said male annular chamber, a spring in said male annular chamber engaging said outwardly extending flange at one end and engaging a shoulder on said second adaptor at the other end, insertion of said male member into said female member causing said male member to engage said first sealing ring prior to engagement with said sleeve valve and thereafter to open said sleeve valve and said hollow extension of said female member engaging said hollow valve member of said male member to move same to said open position, and means for locking said male and female members together.

7. A detachable coupling including in combination a female and a male member, said female member comprising first and second end portions and having wall means defining a bore therethrough, said wall means at said first end portion forming a first groove, a first sealing member residing in said first groove, said wall means at said second end portion forming a second groove, a second sealing member residing in said second groove, means mounting a hollow extension in said female member, said hollow extension extending axially in said bore of said female member and having a closed end terminating short of said first sealing member, said hollow extension being spaced from said wall means of said female member to define an annular chamber therewith, lateral port means providing fluid communications between said hollow extension member and said annular chamber, said closed end of said hollow extension member being of larger diameter than said extension and forming a valve seat, a sleeve valve residing in said annular chamber around said hollow extension member and movable between an open and closed position, said sleeve valve including an annular axially extending sleeve part having first and second end portions and located adjacent said wall means and engageable in all positions with said second sealing member, said first end portion of said sleeve part having first and second inwardly extending flanges defining a valve groove, a sealing member in said valve groove and engageable with said valve seat in closed position of said sleeve valve, said second end portion of said sleeve part having an outwardly extending stop flange, open and closed sleeve valve stops on said female member, said stop flange engageable in open and closed positions with said open and closed sleeve valve stops respectively, a spring member surrounding said hollow extension and engaging said first inwardly extending flange at one end thereof and engaging a shoulder on said female member at the other end thereof to urge said sleeve valve to said closed position, said male member having first and second end portions and wall means defining a bore therethrough, said first end portion including an annular nipple portion having first and second inwardly extending flanges defining a groove, a sealing member residing in said groove, a hollow valve member slidably mounted in said male member and having a closed end at said first end portion of said male member, said closed end of said hollow valve and sealing ring in male member forming a valve closure, said hollow valve member and said bore of said male member defining an annular chamber, lateral port means providing fluid communication between said hollow valve member and said male annular chamber, an outwardly extending flange on said hollow valve member in said male annular chamber, a spring in said male annular chamber and engaging said outwardly extending flange at one end and engaging said male member at the other end, insertion of said male member into said female member causing said male member to engage said first sealing ring prior to engagement with said sleeve valve and thereafter to open said sleeve valve and said hollow extension of said female member engaging said hollow valve member of said male member to move same to said open position, and means for locking said male and female members together.

References Cited in the file of this patent

UNITED STATES PATENTS

| | | |
|---|---|---|
| 1,493,306 | Wilkinson | May 6, 1924 |
| 2,319,015 | Speth | May 11, 1943 |
| 2,391,022 | Main | Dec. 18, 1945 |
| 2,456,045 | Brock | Dec. 14, 1948 |
| 2,614,866 | Ulrich | Oct. 21, 1952 |
| 2,665,928 | Omon et al. | Jan. 12, 1954 |
| 2,705,159 | Pfau | Mar. 29, 1955 |
| 2,706,646 | Olson | Apr. 19, 1955 |
| 2,735,696 | Omon et al. | Feb. 21, 1956 |